Dec. 27, 1949     B. A. McKEAN     2,492,307
STUD DRIVER
Filed June 3, 1946
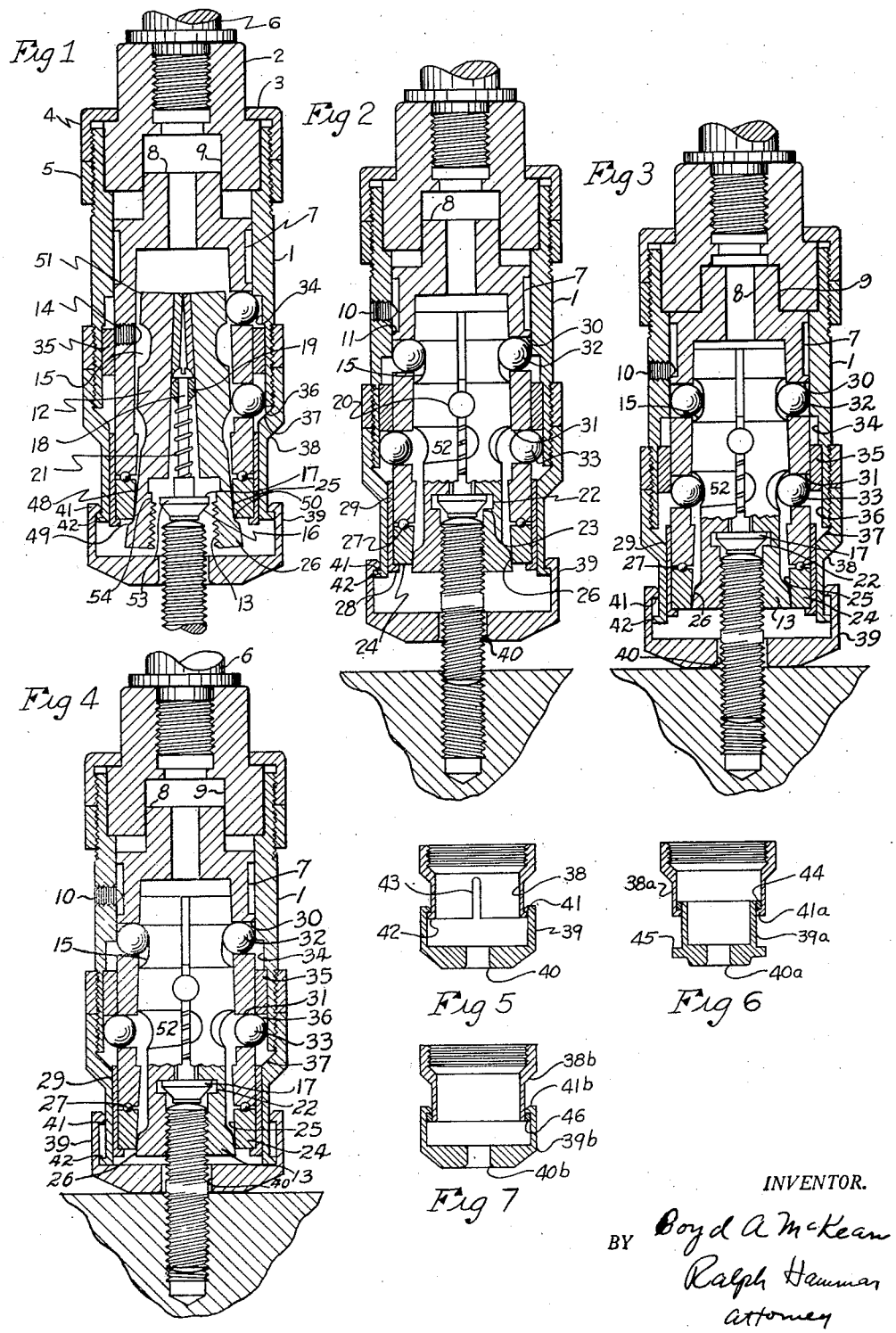

Patented Dec. 27, 1949

2,492,307

UNITED STATES PATENT OFFICE 2,492,307

STUD DRIVER

Boyd A. McKean, Erie, Pa., assignor to Titan Tool Company, Erie, Pa., a corporation of Pennsylvania Application June 3, 1946, Serial No. 674,085

2 Claims. (Cl. 81—53)

1

In stud drivers for driving studs to a short projection height, it has been necessary to use an open type or cylindrical stop for tripping the jaws at the end of the drive. This has been necessary to allow releasing movement of the jaws. The easier to use closed type or cup shaped stop having a stud receiving guide opening in the bottom has heretofore required too much space since the bottom wall of the stop had to be spaced far enough below the jaws to permit the jaw releasing movement. This invention is intended to provide a retractable guide which may be incorporated in a closed type stop, thus obtaining the advantages of the open and closed type stops.

In the drawings, Fig. 1 is a sectional elevation of a stud driver in the starting position, Fig. 2 is a similar view showing the jaws closed on the stud; Fig. 3 is a similar view showing the stud partially driven, Fig. 4 is a similar view showing the jaw drive released, Fig. 5 is a side elevation, partly broken away, of the stop, and Figs. 6 and 7 are similar views of modifications.

In the drawings, 1 indicates the driving member which comprises a sleeve having a clutch 2 loosely held in its upper end by a flange 3 on a threaded retaining ring 4 held in place by a locking ring 5. The clutch member 2 is threaded to receive a shank 6 for attachment to a driving motor. Slidably received within the sleeve 1 is a head 7 having a tapered non-circular clutch jaw 8 receivable in a slot 9 in the clutch member 2. The axial sliding of the head 7 is limited by a set screw 10 which fits in an annular groove 11 in the head. The width of the groove is such that the jaw 8 is never completely removed from the slot 9. The head 7 is therefore continuously driven.

Slidably received within the head 7 are split jaws 12 having threaded stud gripping jaws 13. The jaws are retained in the head by set screws 14, the inner ends of which are receivable in annular grooves 15 in the jaws. In the lowermost position of the jaws shown in Fig. 1, the lower ends of the jaws are split by a cam surface 16 on a stop plug 17 having a shank 18 slidably received in a pin 19 held in mating grooves 20 in the jaws 12. The stop plug is urged downward by a coil spring 21 arranged between the pin 19 and the plug 17.

When the jaws are in the stud gripping position, the plug 17 is received within an annular recess 22 in the jaws and the cam surface 16 is slightly above a shoulder 23 at the lower end of the recess 22. In this position the jaws are cammed together by a cam ring 24 having a

2 conical cam surface 25 which cooperates with a conical surface 26 on the jaws. The cam ring is journaled on the lower end of the head 7 by a ball thrust bearing 27 and is held in place by an inwardly extending flange 28 at the lower end of a sleeve 29 fixed to the head. In the head are sockets 30 and 31 receiving retaining balls 32 and clutch balls 33.

During the use of the stud setting device the head 7 is continuously driven and the balls 32 and 33 are urged outward by centrifugal force. In the position shown in Fig. 1 the retaining balls 32 are received in an annular groove 34 in the sleeve 1 having its lower edge defined by the upper edge of a cam ring 35 pressed into the sleeve. The balls 33 are received in an annular groove 36 having its upper edge defined by the lower edge of the cam ring 35 and its lower edge defined by a tapered surface 37 on a sleeve 38 threaded on the lower end of the sleeve 1.

Slidably and rotatably carried on the sleeve 38 is a cup shaped sleeve 39 having in its bottom wall a flared stud receiving guide opening 40. At the upper end of the sleeve 39 is an inwardly extending annular shoulder 41 which cooperates with an outwardly extending annular shoulder 42 on the sleeve 38 to limit the downward movement of the sleeve 39. The lower end of the sleeve 38 has a plurality of slots 43 which permit sufficient compression of the sleeve 38 so that the shoulder 42 can be inserted within the cup 39. In the lowermost position of the cup 39 the guide opening 40 is slightly below the lower ends of the jaws 12 when the jaws are in the open or extended position shown in Fig. 1. As the stud is driven, the lower end of the cup shaped member 39 contacts the work and moves it upward until it strikes the lower end of the sleeve 38. At this point a force is transmitted to the stud, moving the jaws out of the head 7 and releasing the jaws from the stud. The lowermost position of the cup shaped member 39 may be just slightly below the driving position of the jaws illustrated in Figs. 2 and 3. This permits the driving of studs in which the desired projection after driving is equal to the length of the stud received between the jaws in the driving position plus the distance from the lower ends of the jaws to the bottom of the cup shaped member 39. Since the cup shaped member 39 is retractable due to the sliding connection provided by the shoulders 41 and 42, the projection of the driven stud can be substantially less than has been heretofore possible with stud drivers having closed type stops with a stud guide opening below the lower ends of the jaws. The closed type stop is easier to use since the guide facilitates the insertion of the stud. With the open type stop which would be approximated by the sleeve 38, the insertion of the stud is more difficult since the stud may strike on a corner of one of the jaws and throw the stud driver to one side.

In the modification shown in Fig. 6 the sleeve 38a has an inwardly extending annular shoulder 41a slidably receiving a cup shaped member 39a having in its bottom wall a flared stud receiving guide opening 40a. After the sleeves 38a and 39a are assembled, a ring 44 is pressed on the upper end of the sleeve 39a forming an annular shoulder which limits the downward movement of the sleeve 39a. Upward movement of the sleeve 39a is limited by an outwardly projecting annular shoulder 45 which in the uppermost position engages the lower end of the sleeve 38a.

In the modification shown in Fig. 7 a sleeve 38b corresponding to the sleeves 38 and 38a has its lower end slidably received within a cup shaped member 39b having in its bottom wall a flared stud receiving guide opening 40b. At the upper end of the cup shaped member 39b is an inwardly extending flange 41b which cooperates with a ring 46 pressed on the lower end of the sleeve 38b to limit the downward movement of the cup shaped member 39b. The upward movement of the cup shaped member 39b is limited by engagement of the lower end of the sleeve 38b with the bottom wall of the cup shaped member.

The operation of both of these modifications is the same as the previously described construction. In all of the stops there is a retractable guide which is below the jaws at the start of the stud driving operation to facilitate insertion of the stud and which is retracted to permit driving the stud to a shorter projection. All of the stops have the advantages of easy insertion of the stud obtainable with the closed type stop and the ability to drive studs to a short projected length obtainable with the open type stop.

At the start of the stud driving operation, the driver is positioned over a stud 47 which is received through one of the flared guide openings 40, 40a or 40b. As the stud driver is lowered, the upper end of the stud strikes the stop plug 17 and moves the plug upward into engagement with surfaces 48 on the jaws moving the jaws axially inward within the head 7. During the initial inward movement the jaws are cammed together by cam surfaces 49 on the jaws which cooperate with the lower edge 50 of the cam ring 24. Upon further inward movement the jaws are cammed together by the tapered surface 25 on the cam ring. During this part of the inward movement of the jaws, the head 7 is retained in the position illustrated in Fig. 1 by the retaining balls 32 which are prevented from moving radially inward by surfaces 51 on the upper ends of the jaws. At the end of the initial inward movement of the jaws the groove 15 in the jaws comes opposite the retaining balls 32 and continued inward pressure is transmitted from the jaws through the surfaces 25 and 26 to the head, forcing the head inward within the sleeve 1 and causing the balls 32 to be cammed into the retaining groove 15 by engagement with the upper edge of the groove 34. At this point the parts of the driver are in the position illustrated in Fig. 2 in which the threaded ends 13 of the jaws are clamped on the upper end of the stud and are locked in the clamped position by the retaining balls 32 which are now positioned between the retaining groove 15 and the inner surface of the sleeve 1 above the groove 34. While the jaws are clamped on the stud, the jaws do not rotate since the cam ring 24 which cams the jaws against the stud is journaled on the head.

As the lowering of the stud driver is continued, the head slides inward within the sleeve 1 to the position illustrated in Fig. 3 in which the clutch balls 33 are cammed out of the groove 36 by engagement with the lower edge of the cam ring 35 into inclined grooves 52 in the jaws 12.

The pitch of the grooves 52 is such that the normal driving position of the balls 33 is part way along the length of the grooves. The head 7 rotates relative to the jaws 12 until further inward movement of the jaws in the head is prevented by the pitch of the grooves 52. The inclined grooves cause the jaws to be driven inward by the driving torque providing the tight grip on the studs desirable for driving plated studs. This also compensates for wear of the threaded gripping surfaces 13 of the jaws.

At the start of the stud driving operation the guide openings 40, 40a or 40b are spaced from the work slightly below the position illustrated in Fig. 2. As the stud driving operation continues, the driver moves downward as a unit to the position illustrated in Fig. 3 in which further downward movement of the sleeve 1 is prevented by engagement of the lower end of the sleeves 38, 38a or 38b with the stop surfaces on the cup shaped members 39, 39a or 39b. In this position the guide openings 40, 40a or 40b are adjacent the lower ends of the jaws 12. From this point the head 7 and the jaws 12 move downward with the stud to the position illustrated in Fig. 4 in which the clutch balls 33 come opposite the groove 36 and are moved into the groove by centrifugal force, breaking the driving connection to the stud although the jaws are still clamped to the stud. The stud driver is released by an upward pull on the driver.

During the initial upward movement of the driver, the retaining balls 32 come opposite the groove 34 and are moved into the groove by centrifugal force, unlocking the jaws from the head 7. Upon further upward movement of the driver the set screw 10 engages the upper edge of the groove 11 and stops the outward movement of the head. At this point the upward pull on the driver is effective to break the cam surface 25 away from the jaws and permit the downward movement of the jaws by the spring 21. The force of the spring 21 is transmitted to the jaws through the cam surfaces 16 causing the jaws to spread to the position illustrated in Fig. 1 in which the lower ends of the jaws are held in the spread position by surfaces 53 and 54 on the plug 17 and jaws 12 which prevent closing of the jaws until the plug 17 has been moved inward.

The retractable stop constructions have been disclosed as applied to the stud driver of my application Ser. No. 567,886, filed December 12, 1944. The retractable stops are obviously applicable to any form of stud driver in which the gripping and releasing of the stud is effected by inward and outward movement of the jaws.

What I claim as new is:

1. In a driver of the type having a head carrying jaws axially and radially movable therein, and cam means for closing the jaws on a stud upon axial movement of the jaws into the head, said jaws and head advancing with the stud as it is driven, the combination of a work engaging stop for arresting the movement of the head and thereby causing outward movement of the jaws relative to the head at the end of the driving operation, said stop including a guide below the jaws engaging the work as the stud is driven, a lost motion mounting for the guide on which the guide is freely slidable, means biasing the guide to its outermost position below the jaws whereby after the guide contacts the work the guide moves inward a substantial distance as the head and jaws advance without exerting a force arresting the movement of the head.

2. In a drive of the type having a head carrying jaws axially and radially movable therein, and cam means for closing the jaws on a stud upon axial movement of the jaws into the head, said jaws and head advancing with the stud as it is driven, the combination of a work engaging stop for arresting the movement of the head and thereby causing outward movement of the jaws relative to the head at the end of the driving operation, said stop including a cup freely slideable axially and rotatable in the head with its bottom beneath the jaws and provided with a guide opening for the stud, a shoulder limiting outward movement of the cup and the cup being normally held in its outermost position with the bottom of the cup below the jaws whereby the bottom of the cup engages the work toward the end of the stud driving operation and is moved inward relative to the head, and an abutment on the head engaged by the cup upon inward movement for arresting further movement of the head toward the work.

BOYD A. McKEAN.

REFERENCES CITED

The following references are of record in the file of this patent:

UNITED STATES PATENTS

| Number | Name | Date |
|---|---|---|
| 1,607,804 | Snyder | Nov. 23, 1926 |
| 1,807,265 | Walker | May 26, 1931 |
| 1,817,049 | Weil | Aug. 4, 1931 |

FOREIGN PATENTS

| Number | Country | Date |
|---|---|---|
| 439,245 | Germany | Dec. 6, 1924 |